(12) United States Patent
Mortelmans et al.

(10) Patent No.: US 8,524,791 B2
(45) Date of Patent: Sep. 3, 2013

(54) PROCESS FOR THE PREPARATION OF FLEXIBLE, RESILIENT POLYURETHANE FOAM AND THE RESULTING FOAM

(75) Inventors: Rudi Mortelmans, Steendorp (BE); Koen Raman, Evergem (BE)

(73) Assignee: Recticel, Brussels (Evere) (BE)

( * ) Notice: Subject to any disclaimer, the term of this patent is extended or adjusted under 35 U.S.C. 154(b) by 0 days.

(21) Appl. No.: 13/119,287

(22) PCT Filed: Sep. 24, 2009

(86) PCT No.: PCT/EP2009/062375
§ 371 (c)(1),
(2), (4) Date: Mar. 16, 2011

(87) PCT Pub. No.: WO2010/034770
PCT Pub. Date: Apr. 1, 2010

(65) Prior Publication Data
US 2011/0166244 A1 Jul. 7, 2011

(30) Foreign Application Priority Data
Sep. 24, 2008 (EP) .................................... 08165021

(51) Int. Cl.
*C08G 18/28* (2006.01)
(52) U.S. Cl.
USPC ......................................... 521/137; 521/174
(58) Field of Classification Search
USPC ............................................... 521/137, 174
See application file for complete search history.

(56) References Cited

U.S. PATENT DOCUMENTS

| 2003/0087977 | A1 | 5/2003 | Parfondry et al. | |
| 2007/0213420 | A1* | 9/2007 | Kimura et al. | 521/99 |
| 2011/0034575 | A1* | 2/2011 | Triouleyre et al. | 521/137 |

FOREIGN PATENT DOCUMENTS

EP 0 367 283 A2 5/1990

OTHER PUBLICATIONS

Database WPI Week 200333 Thomas Scientific, London, GB; AN 2003-345985, XP002562816.

* cited by examiner

*Primary Examiner* — John Cooney
(74) *Attorney, Agent, or Firm* — Sughrue Mion, PLLC

(57) ABSTRACT

The flexible, resilient polyurethane foam is prepared by reacting at least one polyisocyanate with one or more liquid compounds which have at least two isocyanate reactive groups and at least one of which contain one or more solid polymers stably dispersed therein in an amount of 2.5 to 35 parts per 100 parts of said liquid isocyanate reactive groups containing compounds. The wet compression set of the flexible polyurethane foam could be considerably reduced by including in said liquid isocyanate reactive groups containing compounds, per 100 parts thereof, (I) 50 to 80 parts of one or more polyoxyalkylene polyols having an oxyethylene unit content of at least 40 wt. %, a hydroxyl number of between 20 and 100, and a nominal functionality of 2 to 4; and (II) 20 to 50 parts of one or more further polyoxyalkylene polyols containing no oxyethylene units or having an oxyethylene unit content lower than 40 wt. %, and having a hydroxyl number of between 20 and 100 and a nominal functionality of 2 to 4.

19 Claims, No Drawings

PROCESS FOR THE PREPARATION OF FLEXIBLE, RESILIENT POLYURETHANE FOAM AND THE RESULTING FOAM

CROSS REFERENCE TO RELATED APPLICATIONS

This application is a National Stage of International Application No. PCT/EP2009/062375 filed on Sep. 24, 2009, which claims priority from European Patent Application No. 08165021.0, filed on Sep. 24, 2008, the contents of all which are incorporated herein by reference in their entirety.

The present invention relates to the preparation of flexible polyurethane foam having a density of between 30 and 70 kg/m$^3$, a resilience, measured in accordance with ASTM D 3574 H, higher than 40%, an ILD 40% hardness, measured in accordance with ISO 2439 B, of between 75 and 250 N, by reacting at least one polyisocyanate having at least two isocyanate groups with one or more liquid compounds which have at least two isocyanate reactive groups and at least one of which contain one or more solid polymers stably dispersed therein in an amount of 2.5 to 35 parts per 100 parts of said liquid isocyanate reactive groups containing compounds.

Such flexible polyurethane foam is widely used for seats, bedding (mattresses) and miscellaneous goods due to the cushioning properties of the foam. Flexible, resilient foam is prepared by reacting a polyisocyanate composition with a polyol composition in the presence of a blowing agent such as water, a surfactant and a catalyst such as amine and a tin compound. Water, the blowing agent, reacts with the polyisocyanate and releases carbon dioxide which acts as blowing gas. At the same time, polyurea is formed and built in the foam structure.

For the seating (both car interiors and furniture) and bedding applications, the flexible polyurethane foam has to show certain load bearing properties. It should have a hardness (ILD 40%) in the range of between 75 N and 250 N, and preferably between 90 N and 200 N. Resilient foams, or the so-called high resilience (HR) foams, with such higher hardness are often produced with the use of so-called polymer polyols.

Polymer polyols are dispersions of a solid polymer in a liquid polyol phase. The dispersed polymer can be a polymer of one or more ethylenically unsaturated monomers, an epoxy resin, a polyurethane or a polyurea. Of these, dispersions of styrene and/or acrylonitrile polymer and copolymers (the so-called SAN polyols), polyurea dispersions (the so-called PHD polyols) and polyurea-polyurethane dispersions (the so-called PIPA polyols) are most commonly used. The hardness of the foam can be controlled by increasing or decreasing the solids content of the polymer polyol.

As disclosed in EP 0 731 120 a drawback of polymer polyols is that they impair the elasticity or resilience of the produced foam and especially also the durability thereof. This leads to various problems. For example, the thickness of a bedding or a vehicle cushion will decrease in the course of its use. Particularly with vehicle cushions, long time vehicle driving will decrease the designed thickness and hardness thereof, lowering the prescribed position of the driver, narrowing the field of view of the driver and thus impairing the driver's safety and driving comfort.

An important parameter to evaluate the durability is the wet compression set. This property relates to the compression set in conditions of high temperature and humidity, due to plasticization of the polyurethane polymer by adsorbed water, or by changes in polymer structure due to hydrolysis, or to reaction of unreacted isocyanate groups with atmospheric water, and disruption of hydrogen bonding between polar linkages in the polymer backbone. The wet compression set (WCS) is measured by determining the height loss of a foam sample, after it has been compressed to a certain extent during several hours and at an elevated temperature and a high relative humidity. The wet compression set should thus preferably be as low as possible, for example lower than 5% or even lower than 2.5% when determined in accordance with the severe Renault 1637 test method. The WCS in particular is an important quality criterion for high resilience foams when used as mattresses and upholstery materials. It is known that the WCS of commercial HR foams made from a polymer polyol containing a considerable amount of solid polymer is generally relatively high, in practice typically around 15% for typical high resilient foams, such as 837130 available from Recticel. There are however also high resilient foams with much higher WCS, for example the high resilient foams disclosed in EP 0 449 609 having a WCS in the range of 90 to 100% (measured by the Renault test method).

Several attempts to improve the WCS of flexible foams made with polymer polyols containing a considerable amount of solid polymer are known from the prior art.

In order to lower the wet compression set of a polyurethane foam made with a polymer polyol, U.S. Pat. No. 6,087,410 discloses for instance to add a wet set additive consisting of an ethylene oxide-rich adduct having an ethylene oxide content of more than 50% by weight, a functionality of 3 to 8 and a hydroxyl number of 200 to 800 mg KOH/g (i.e. an equivalent weight of between 70 and 280). This low molecular weight adduct is added in an amount of between 0.5 and 10 wt. % to the polyol composition. Notwithstanding this amount of crosslinking adduct, the produced polyurethane foams still have a very high wet compression set (higher than 20%). Moreover, a disadvantage of the use of such crosslinking adducts is that they reduce the mechanical properties such as elongation and tear resistance of flexible foam.

EP 0 367 283 discloses the use of a wet set additive, which comprises a relatively low molecular weight ethylene oxide adduct having a low functionality of 2 to 3, to lower the wet compression set without significant reduction of elongation and load bearing values. The foam formulation contains a polymer polyol for controlling the load bearing properties of the foam. The wet set additive is used in an amount of 1 to 6 parts per one hundred parts of polyol. Notwithstanding the addition of this wet set additive, the wet compression set of the obtained foams is still higher than 10%.

U.S. Pat. No. 4,929,646 does not disclose wet compression set properties but discloses the use of an EO rich polyether polyol which contains at least 50 wt. % oxyethylene units (EO units) and which has a high functionality (functionality of at least 4) and a high molecular weight for producing flexible polyurethane foam. This polyether polyol is used in combination with a polymer polyol and is intended to achieve an open cell foam which is moreover softened by the EO rich polyether polyol. To achieve this softening effect, the EO rich polyether polyol is used again in a relatively small amount of 0.1 to 10 parts per one hundred parts of the other polyol compound.

It is an object of the present invention to provide a new process which enables to prepare resilient flexible polyurethane foams, which have a density of between 30 and 70 kg/m$^3$, an ILD 40% hardness of between 75 and 250 N, and a wet compression set, measured in accordance with Renault 1637, which is lower than 5% and preferably even lower than 2.5%.

In the process according to the invention, the wet compression set of the flexible polyurethane foam is reduced to a value of less than 5%, preferably to a value of less than 2.5% (measured in accordance with Renault 1637), in spite of the fact that the liquid isocyanate reactive groups containing compounds contain a considerable amount of solid polymer dispersed therein, by including in said liquid isocyanate reactive groups containing compounds, per 100 parts thereof:

a) 50 to 80 parts of one or more polyoxyalkylene polyols having an oxyethylene unit content of at least 40 wt. % of the oxyalkylene units of the polyoxyalkylene polyol, a hydroxyl number of between 20 and 100, preferably of between 20 and 60, and a nominal functionality of 2 to 4;

b) 20 to 50 parts of one or more further polyoxyalkylene polyols containing no oxyethylene units or having an oxyethylene unit content lower than 40 wt. % of the oxyalkylene units of the further polyoxyalkylene polyol, and having a hydroxyl number of between 20 and 100, preferably of between 20 and 60, and a nominal functionality of 2 to 4.

Compared to the prior art wherein resilient polyurethane foams are made with a polymer polyol containing a considerable amount of dispersed polymer, a much larger amount of a polyol with high oxyethylene unit content (type a polyol) is used in the process according to the invention. Notwithstanding the softening effects of such EO rich polyol, it was found that the required foam hardness could still be achieved without having to use excessive amounts of polymer polyol. Further, it was found quite surprisingly that the large amounts of the EO rich polyol, which has the described functionality and hydroxyl number, enable to produce flexible, resilient foams with very low wet compression sets, i.e. wet compression sets lower than 5% or lower than 2.5% or even lower than 1%. Indeed, such high amounts of EO rich polyol are expected to impair the humid ageing properties, due to their hydrophilic nature. An additional advantage of the EO rich polyol is that an open cell foam is achieved so that no additional crushing or reticulation step is required and so that possible shrinkage of the foam in the cooling phase is avoided.

US 2003/0087977 discloses a prepolymer process for preparing a high resilience flexible polyurethane foam wherein an EO rich polyol is used in combination with one or more polyols which contain less EO. US 2003/0087977 moreover discloses that the polyol or polyols may contain dispersed material. However, only in one example, namely in Example 2, a polymer polyol was used. In this example, a polyurethane foam with the highest density was produced and this only with a very small amount of polymer polyol (about 1.8 parts of solid polymer per 100 of the liquid polyols). Although wet compression sets are given for some of the other examples, no wet compression set is given for this example. Knowing that a higher foam density results in a reduced wet compression set whilst a higher amount of solid polymer results in an increased wet compression set, it is clear for a skilled person that in the example with the polymer polyol only a small amount of solid polymer was used in combination with a high foam density to maintain the wet compression set sufficiently low. A skilled person faced with the problem of producing a polyurethane foam with a low wet compressing set, would thus not increase the amount of polymer polyol used in Example 2 of US 2003/0087977. According to the invention, it has however been found quite surprisingly that the wet compression set of flexible polyurethane foams made with a considerable amount of polymer polyol can be kept very low, notwithstanding the presence of the solid polymer, by using a quite high amount of EO rich polyol.

In a preferred embodiment of the process according to the invention, the liquid isocyanate reactive groups containing compounds comprise, per 100 parts thereof, at least 5 parts, preferably at least 10 parts, of said at least one stably dispersed solid polymer.

Such higher amounts of solid polymer enable to achieve higher hardnesses (more rigid foams) without having to use crosslinkers which impair the mechanical properties such as tear resistance and elongation. Moreover, it was found that even with such high amounts of solid polymer, the wet compression set of the foam could be kept very low.

Preferably, the liquid isocyanate reactive groups containing compounds comprise no crosslinkers/extenders having a hydroxyl number greater than 100 or, per 100 parts of said liquid isocyanate reactive groups containing compounds, less than 5 parts, preferably less than 2.5 parts, of such crosslinkers/extenders.

The liquid isocyanate reactive groups containing compounds comprise in particular no alkanolamines having a hydroxyl number greater than 100 or, per 100 parts of said isocyanate reactive groups containing compounds, less than 1 part, preferably less than 0.5 parts, of such alkanolamines. As described in US 2003/0036578, alkanolamines cause an undesired reduction in the rigidity of the foam and lead to lower stability of the foam due to the action of heat and moisture, i.e. in particular lead to a worse wet compression set. U.S. Pat. No. 5,011,908 moreover discloses that a quite specific amount of diethanolamine (DEOA) is required for the production of high resilient (HR) slabstock foam. The lower DEOA limit is characterized by excessive settle or collapse while, at the upper limit, the foam will show shrinkage. In the process according to the present invention, the use of alkanolamines is surprisingly not required due to the high amounts of the specific EO rich polyol or polyols which are used therein in combination with the polymer polyol.

The invention also relates to a resilient, flexible polyurethane foam obtained by the process according to the invention and having a density of between 30 and 70 kg/m$^3$, a resilience, measured in accordance with ASTM D 3574 H, higher than 40%, an ILD 40% hardness, measured according to ISO 2439 B of between 75 and 250 N and a wet compression set, measured in accordance with Renault 1637, of less than 5%.

Other particularities and advantages of the invention will become apparent from the following description of some particular embodiments of the process and the polyurethane foam obtained according to the process of the present invention.

The invention is directed to a process for the preparation of resilient, flexible polyurethane foam having a density of between 30 and 70 kg/m$^3$, and preferably between 38 and 50 kg/m$^3$. The term "flexible foam" indicates a foam which has an ILD 40% hardness of between 75 and 250 N. This foam is different from the soft or hypersoft foams, having a lower ILD 40% hardness, and the more rigid foams having a higher ILD 40% hardness. The polyurethane foam according to the invention is in particular suitable for seating and bedding applications and has preferably an ILD 40% hardness of between 90 and 200 N. An important feature of such foam is its durability, more particularly its wet compression set. The foam made in accordance with the present invention should have a wet compression set, measured in accordance with Renault 1637, of less than 5%, preferably less than 2.5%. The term "resilient foam" indicates a foam which has a resilience or ball rebound, measured in accordance with ASTM D 3574 H, higher than 40%, and preferably higher than 50%. The polyurethane foam is more preferably a high resilience (HR) foam having a resilience higher than 55%. The resilient foams, including so-called conventional polyurethane foams and high resilience polyurethane foams, are a class of foams which are clearly distinguished from the so-called viscoelastic foams. These viscoelastic foams have resilience figures which are markedly lower than 40%, and are usually even lower than 15%.

The process according to the invention comprises the step of preparing a foam formulation from at least one polyisocyanate compound having at least two isocyanate groups, one or more liquid compounds (I.e. compounds which are liquid at 18° C.) which have at least two isocyanate reactive groups, water, a catalyst and a surfactant, and the step of allowing the foam formulation to foam and cure. At least one of the liquid isocyanate reactive groups containing compounds contain one or more solid polymers (i.e. polymers which are solid at 50° C.) stably dispersed therein in an amount of 2.5 to 35 parts per 100 parts of said liquid isocyanate reactive groups containing compounds. The known one-shot, semi-prepolymer or full prepolymer techniques may be used together with conventional mixing equipment and the foams may be produced in the form of slabstock, mouldings and the like. When the prepolymer techniques are employed each of the different polyol compounds alone or in a mixture may be used to pre-react with the polyisocyanate compound. The amounts indicated are in such a case calculated on the polyol or polyols in the prepolymer and the polyol or polyols in the remaining isocyanate reactive composition. In the one-shot technique, the isocyanate reactive composition is reacted with the isocyanate component simultaneously with the other components, in particular with the water as blowing agent.

The polyisocyanate composition comprises usually only one but may comprise more than one polyisocyanate compounds (=polyisocyanates). Organic polyisocyanates which are conventionally used in the preparation of flexible polyurethane foams include aliphatic, cycloaliphatic and araliphatic polyisocyanates, as well as aromatic polyisocyanates, such as the commercial TDI (toluene diisocyanate), MDI (diphenylmethane diisocyanate), and crude or polymeric MDI.

Polymeric MDI may contain at least 70% by weight of pure MDI (4,4'-isomer or isomer mixture) and up to 30% by weight of the so-called polymeric MDI containing from 25 to 65% by weight of diisocyanates, the remainder being largely polymethylene polyphenylene polyisocyanates having isocyanate functionalities greater than 2. Mixtures may also be used of pure MDI and polymeric MDI compositions containing higher proportions (up to 100%) of the said higher functionality polyisocyanates.

Modified isocyanates are also useful. Such isocyanates are generally prepared through the reaction of a commercial isocyanate, for example TDI or MDI, with a low molecular weight diol or amine. Modified isocyanates can also be prepared through the reaction of the isocyanates with themselves, producing isocyanates containing allophanate, uretonimine, carbodiimide or isocyanurate linkages. Modified forms of MDI including polyurea dispersions in MDI have for instance been described in EP-A-0 103 996.

In order to enable to achieve a resilient, flexible polyurethane foam with the required ILD 40% hardness of 75 to 250 N, and preferably of 90 to 200 N, at least one solid polymer is stably dispersed in one or more of the liquid polyols and this in an amount of between 2.5 and 35 parts per 100 parts of the liquid isocyanate reactive groups containing compounds. Preferably, at least 5 parts, more preferably at least 10 parts of at least one solid polymer are stably dispersed in one or more of the polyols, per 100 parts of the liquid isocyanate reactive groups containing compounds.

The production of stably dispersed polymers within polyols to make polymer polyols is known in the art. The basic patents in the field are U.S. Pat. No. 3,383,351 and U.S. Pat. No. 3,304,273. Such compositions can be produced by polymerizing one or more ethylenically unsaturated monomers dissolved or dispersed in a polyol in the presence of a free radical catalyst to form a stable dispersion of polymer particles in the polyol. These polymer polyol compositions have the valuable property of imparting to polyurethane foams produced therefrom higher load-bearing properties than are provided by the corresponding unmodified polyols. Also included are the polyols like those taught in U.S. Pat. No. 3,325,421 and U.S. Pat. No. 4,374,209.

A wide variety of monomers may be utilized in the preparation of the polymer polyol. Numerous ethylenically unsaturated monomers are disclosed in the prior patents and polyurea and polyurethane suspension polymers can also been utilized. Exemplary monomers include styrene and its derivatives such as para-methylstyrene, acrylates, methacrylates such as methyl methacrylate, acrylonitrile and other nitrile derivatives such as methacrylonitrile, and the like. Vinylidene chloride may also be employed. The preferred monomer mixtures used to make the polymer polyol are mixtures of acrylonitrile and styrene (SAN polyols) or acrylonitrile, styrene and vinylidene chloride.

Polymer polyols, such as the preferred SAN polyols, are readily available on the market with varying solid contents. If this solid content is too high, it can easily be lowered by mixing the polymer polyol with a further polyol which does not contain a dispersed polymer.

The solid polymer may contain some isocyanate reactive groups. However, even in this case, the amount of solid polymer is not included in the amount of the liquid isocyanate reactive groups containing compounds since the solid polymer is not liquid.

A drawback of the relatively high amount of solid polymer is that it has a negative effect on the wet compression set of the foam. To enable to achieve a polyurethane foam having a low wet compression set, in particular a wet compression set, measured in accordance with Renault 1637 of less than 5%, preferably of less than 2.5% and more preferably of less than 1%, the liquid isocyanate reactive groups containing compounds include, per 100 parts by weight thereof (not including the water and the dispersed polymer):

a) 50 to 80 parts of one or more polyoxyalkylene polyols having an oxyethylene unit content of at least 40 wt. % of the oxyalkylene units of the polyoxyalkylene polyol, a hydroxyl number of between 20 and 100, preferably of between 20 and 60, and a nominal functionality of 2 to 4; and b) 20 to 50 parts of one or more further polyoxyalkylene polyols containing no oxyethylene units or having an oxyethylene unit content lower than 40 wt. % of the oxyalkylene units of the further polyoxyalkylene polyol, and having a hydroxyl number of between 20 and 100, preferably of between 20 and 60, and a nominal functionality of 2 to 4.

The term "nominal functionality" is used herein to indicate the functionality (number of hydroxyl groups per molecule) of the polyol on the assumption that the functionality of the polyoxyalkylene polyol is equal to the functionality (=number of active hydrogen atoms per molecule) of the initiator used in its preparation, although in practice it will often be somewhat less because of some terminal unsaturation. When two or more initiators are used so that a mixture of polyoxyalkylene polyols is obtained, each of the different polyols of this mixture is to be considered as a separate polyol (isocyanate reactive compound). The initiator may be for example glycerine, trimethylolpropane or diethylene triamine.

The parts and percentages mentioned in the present specification are all by weight.

The term "hydroxyl number" indicates the number of milligrams KOH which are equivalent to one gram of polyol sample so that the equivalent weight of the polyol=56100/hydroxyl number.

The polyoxyalkylene polyols of type a which have an oxyethylene unit content of at least 40 wt. %, i.e. the EO rich polyol or polyols, are preferably used in an amount of at least 55 parts, more preferably in an amount of at least 60 parts, and most preferably in an amount of at least 65 parts per 100 parts of the isocyanate reactive groups containing compounds. Preferably, they are used in an amount of less than 75 parts per 100 parts of the isocyanate reactive groups containing compounds in view of the better mechanical properties which can be achieved and also in view of maintaining a good processability.

Due to the high amount of the EO rich polyol or polyols, the obtained flexible foam is a completely open cell foam. Such foam does not shrink after its production, and does not require a separate crushing or reticulation step, as is usually required with the conventional HR polyurethane foams. The EO rich polyol or polyols preferably have an oxyethylene unit content of at least 50 wt. %, more preferably of at least 60 wt. % and most preferably of at least 70 wt. %, of the oxyalkylene units of the polyoxyalkylene polyol. Advantagously, the EO rich polyol or polyols have an oxyethylene unit content of less than 90 wt. %, preferably of less than 85 wt. % and more preferably of less than 80 wt. %, of the oxyalkylene units of the polyoxyalkylene polyol.

In addition to the oxyethylene units, the oxyalkylene chains usually comprise oxypropylene units. A portion of the ethylene oxide (in particular less than 25% of the oxylkylene units) may be used for end capping the oxyalkylene chains so that the polyol has a higher primary hydroxyl content, for example a primary OH content higher than 50%. In this way, the polyol is more reactive towards the isocyanates. The remaining part of the oxyethylene units should be distributed over the oxyalkylene chain and this preferably randomly.

The isocyanate reactive compounds may contain, in addition to the EO rich polyol or polyols of type a and the further polyol or polyols of type b (which have a lower EO content), other compounds which have a relatively large equivalent weight, more particularly an equivalent weight higher than 561 (=56100/100). These compounds include for example polyesters containing primary or secondary hydroxyl groups or also polyamines. However, the isocyanate reactive compounds preferably comprise, per 100 parts, at least 85 parts, more preferably at least 95 parts, of the EO rich polyol or polyols of type a and of the further polyol or polyols of type b (which are polyether polyols).

The isocyanate reactive compounds may also contain crosslinkers/extenders which have a hydroxyl number greater than 100 (i.e. an equivalent weight of less than 561). However, in the process according to the invention these crosslinkers/extenders are not required and, in view of their undesired effects on the foam properties (worse mechanical properties), they are preferably not used or used only in small amounts, i.e. in a total amount of less than 5 parts, preferably of less than 2.5 parts, per 100 parts of the isocyanate reactive groups containing compounds. The crosslinkers/extenders may also comprise alkanolamines. However, these alkanolamines lower the rigidity of the foam and increase also the wet compression set thereof. In the process according to the invention, these alkanolamines are therefore preferably not used, or if they are used, only in quite low amounts of less than 1 part, preferably of less than 0.5 parts, per 100 parts of the isocyanate reactive groups containing compounds.

By the process according to the invention, foams can be produced having a tear resistance, measured in accordance with ASTM D3574 F, higher than 1 N/cm, an elongation, measured in accordance with EN ISO 1798, higher than 100%, and a tensile strength, measured in accordance with EN ISO 1798, higher than 50 kPa, preferably higher than 70 kPa.

The preferred foaming agent for use in the process of the invention is water, optionally in conjunction with a physical blowing agent, for example a low boiling organofluoro compound. As is known to the skilled person, the amount of foaming agent may be varied in order to achieve the desired foam density. Preferably water is the only foaming agent. The isocyanate index (NCO index) of the reaction system may vary between 80 and 120, but is preferably higher than 90 and more preferably higher than 100. A higher isocyanate index can assist in achieving a higher foam hardness.

The foam formulation may contain one or more of the additives conventional to polyurethane foam formulations. Such additives include catalysts, for example tertiary amines and tin compounds, surface-active agents and foam stabilisers, for example siloxane-oxyalkylene copolymers, flame retardants, organic and inorganic fillers, pigments, agents for suppressing the so-called boiling-foam effect such as polydimethyl siloxanes, and internal mould release agents for moulding applications.

The following examples are provided to illustrate the invention but are not intended to limit the scope thereof. All parts are by weight.

EXAMPLES

Description of the Compounds Used in the Examples:

Polyol 1: a polyoxyalkylene polyol having an oxyethylene content of 70-75%, an OH number of 34 and a functionality of 3.

Polyol 2: a SAN filled polyol, comprising a dispersion prepared from a polyoxyalkylene polyol grafted with 25% by weight of styrene and acrylonitrile, and having an oxyethylene content of less than 20%, an OH number of 28 and a functionality of 3.

Polyol 3: a SAN filled polyol, comprising a dispersion prepared from a polyoxyalkylene base polyol grafted with 44% by weight of styrene/acrylonitrile copolymer particles, and having an oxyethylene content of less than 15%, an OH value of 34 and a functionality of 3.

Polyol 4: a polyoxyalkylene polyol having a oxyethylene content of less than 15%, an OH number of 48 and a functionality of 3.

Preparation of the Foam Samples:

The PU foams of examples 1 to 11 were prepared in a one-shot process by mixing the components as indicated in Table 1 and Table 2 using a slabstock foam machine having a high pressure mixing head, and dispensing the resulting foaming mixture and allowing it to rise and cure.

After sufficient cure time, the produced foams were submitted to mechanical properties measurements. The results of these tests are also given in Table 1 and 2. The used methods to measure the mechanical properties are presented in Table 3.

According to the Renault 1637 method to determine the wet compression set, the foam sample of about 5 cm is compressed at 70 during 22 hours at a temperature of 50° C. and a relative humidity of 95%. After a recovery time of 15 minutes the wet compression set is calculated according to the formula:

$$WCS(\%) = \frac{H_0 - H_1}{H_0 - H_2} * 100$$

wherein $H_0$ is the initial foam sample thickness, $H_1$ is the foam sample thickness of the recovered foam after compression (after a recovery time of 15 minutes), and $H_2$ is the spacer thickness (15 mm), i.e. the foam sample thickness during compression.

In the prior art, other test methods are often used for determining the wet compression set, for example the method according to ISO 13362, but these methods result in substantially smaller wet compression sets (due to the fact that the height loss is measured after a longer recovery time of for example 30 minutes and/or by expressing the height loss as a percentage of the initial height).

The air resistance of the foam sample is measured by putting a specific air flow (15.2 l/min. −23° C. −1013 mbar feeding pressure) via a 8 mm tube, which is mounted on a 10 cm diameter measuring base, which is positioned on the top surface of a foam sample. The air resistance is measured as the counterpressure (hPa) through a digital pressure indicator in hPa, and is expressed as cm water column (1 hPa=1 cm water column). According to this method, open-celled foams have an air resistance of <15 cm water column, whereas typical HR foams have an air resistance of >30 cm water column, due to their mainly closed-cell structure.

TABLE 1

| EXAMPLE | 1 | 2 | 3 | 4 | 5 |
|---|---|---|---|---|---|
| COMPOSITION (parts by weight) | | | | | |
| polyol 1 | 75 | 60 | 60 | 70 | 60 |
| polyol 2 | 25 | 40 | — | — | — |
| polyol 3 | — | — | 40 | 30 | 30 |
| polyol 4 | — | — | — | — | 10 |
| water | 2 | 2.05 | 2 | 2 | 2 |
| TDI 80/20 | 29 | 26.5 | 29 | 28.3 | 27.1 |
| Teda Dabco CO33LV | 0.87 | 0.93 | 0.9 | 0.9 | 0.5 |
| Tegostab B 4900 | 0.6 | 0.6 | 0.6 | 0.6 | 0.6 |
| stannous octoate | — | — | — | — | 0.075 |
| NCO index | 112 | 102.5 | 112 | 112 | 104 |
| RECALCULATED POLYOL COMPOSITION | | | | | |
| a) parts EO rich polyol on 100 parts polyol (without solids) | 80 | 67 | 73 | 81 | 69 |
| b) parts other polyols on 100 parts polyol (without solids) | 20 | 33 | 27 | 19 | 31 |
| c) parts solids on 100 parts polyol (without solids) | 6.7 | 11.1 | 21.4 | 15.2 | 15.2 |
| MECHANICAL PROPERTIES | | | | | |
| density (kg/m3) | 41.9 | 43.8 | 43.7 | 42.4 | 42.6 |
| ILD hardness at 40% (N) | 113 | 92 | 179 | 156 | 97 |
| sag factor | 2 | 2.4 | 2.4 | 1.9 | 2.4 |
| CLD hardness (40%) (kPa) | 2.8 | — | 4.5 | 3.8 | — |
| air resistance | 1.7-2.2 | 3-3.8 | 4.5-5.2 | 3.2-4.5 | 7-10 |
| tear resistance (N/cm) | 1 | 2.8 | 1.2 | 0.7 | 3 |
| tensile strength (kPa) | 57 | 96 | 68 | 57 | 95 |
| elongation (%) | 136 | 210 | 85 | 91 | 258 |
| wet compression set (%) | 0 | 0.4 | 0 | 0 | 0.6 |
| resilience (%) | 57 | 60 | 49 | 51 | 51 |
| dynamic fatigue | | | | | |
| height loss (%) | 0.9 | 0.9 | 1.5 | 1.5 | 1.2 |
| hardness loss (%) | 18.9 | 18.1 | 22.3 | 21.7 | 21.3 |

TABLE 2

| EXAMPLE | 6 | 7 | 8 | 9 | 10 | 11 (comp.) |
|---|---|---|---|---|---|---|
| COMPOSITION (parts by weight) | | | | | | |
| Polyol 1 | 60 | 50 | 50 | 50 | 40 | 30 |
| Polyol 2 | — | — | — | — | — | — |
| Polyol 3 | 25 | 40 | 40 | 50 | 50 | 50 |
| Polyol 4 | 15 | 10 | 10 | — | 10 | 20 |
| water | 2 | 2 | 2 | 2 | 2.1 | 2.1 |
| TDI 80/20 | 28.8 | 27.1 | 28.6 | 29.4 | 27.3 | 27.5 |
| Teda Dabco CO33LV | 0.9 | 0.5 | 0.5 | 0.9 | 0.85 | 0.85 |
| Tegostab B 4900 | 0.6 | 0.6 | 0.6 | 0.6 | 0.6 | 0.6 |
| stannous octoate | — | 0.075 | 0.075 | — | 0.075 | — |
| NCO index | 112 | 104 | 110 | 112 | 105 | 105 |
| RECALCULATED COMPOSITION | | | | | | |
| a) parts EO rich polyol (type a) on 100 parts polyol (without solids) | 67 | 61 | 61 | 64 | 51 | 38 |
| b) parts other polyols (type b) on 100 parts polyol (without solids) | 33 | 39 | 39 | 36 | 49 | 62 |
| c) parts solids on 100 parts polyol (without solids) | 12.4 | 21.4 | 21.4 | 28.2 | 28.2 | 28.2 |

TABLE 2-continued

| | EXAMPLE | | | | | |
|---|---|---|---|---|---|---|
| | 6 | 7 | 8 | 9 | 10 | 11 (comp.) |
| MECHANICAL PROPERTIES | | | | | | |
| density (kg/m3) | 42.3 | 43.8 | 43.1 | 42.2 | 54 | collapse |
| ILD hardness at 40% (N) | 102 | 103 | 185 | 210 | 250 | — |
| sag factor | 2.4 | 2.6 | 2.3 | 2 | 2.5 | — |
| CLD hardness (40%) (kPa) | 2.3 | — | — | 5.4 | — | — |
| air resistance | 2.5-2.7 | 5.5-7.5 | 14-25 | 8.1-19 | 32-36 | collapse |
| tear resistance (N/cm) | 1.8 | 1.6 | 1.5 | 1.6 | 2 | — |
| tensile strength (kPa) | 79 | 61 | 85 | 99 | 103 | — |
| elongation (%) | 156 | 137 | 100 | 104 | 142 | — |
| wet compression set (%) | 0 | 1 | 0.6 | 0.4 | 2.9 | — |
| resilience (%) | 59 | 49 | 52 | 51 | 55 | — |
| dynamic fatigue | | | | | | |
| height loss (%) | 1.7 | 1.5 | 2.1 | 1.3 | — | — |
| hardness loss (%) | 18.2 | 24.5 | 19.7 | 21.3 | — | — |

TABLE 3

| property | unit | method |
|---|---|---|
| density | kg/m$^3$ | ISO 845 |
| ILD hardness at 40% | N | ISO 2439B |
| sag factor | | =ILD 60%/ILD 40% |
| CLD hardness at 40% | kPa | ISO 3386/1 |
| air resistance | cm water column | internal method |
| tear resistance | N/cm | ASTM D3574 F |
| tensile strength | kPa | EN ISO 1798 |
| elongation | % | EN ISO 1798 |
| resilience | % | ASTM D 3574 H |
| wet compression set | % | Renault 1637 (50° C.) |
| dynamic fatigue | | ISO 3385 |
| height loss | % | |
| hardness loss | % | |

Examples 1 to 10 are produced according to the invention, and illustrate that according to this, polyurethane foams can be obtained having a good resilience and a very small wet compression set. Example 10 more particularly shows that using an EO rich polyol (type a) in a rather low amount of 50 parts per 100 parts polyol, a wet compression set of less than 5% can be obtained. The other examples show that even lower wet compression sets (lower than 1.5%) can be obtained when increasing the amount of the EO rich polyol of type a.

The processability of the foam of Example 10 was borderline, since a lower foam stability was observed (densification of the foam). This processability could however be improved by using higher amounts of the EO rich polyol of type a.

Using an amount of 80 parts of the rich % EO polyol, as illustrated in examples 1 and 4, shows that foams can be obtained with such a high amount of EO rich polyol which still have a sufficient tear resistance and tensile strength and which have moreover an extremely low wet compression set of <1%. Also a very good processability and foam stability was observed.

With a somewhat smaller amount of the EO rich polyol, the tear resistance and the tensile strength are improved so that use is preferably made of less than 70 parts of the EO rich polyol per 100 parts polyol, as can be seen from examples 2, 5, 6, 7, 8 and 9.

Example 11 is a comparative example, and shows that using a too low amount of the EO rich polyol (i.e. lower than 50 parts per 100 parts polyol), is not processable anymore (collapse).

The invention claimed is:

1. A process for the preparation of flexible polyurethane foam having a density of between 30 and 70 kg/m$^3$, a resilience, measured in accordance with ASTM D 3574 H, higher than 40%, an ILD 40% hardness, measured in accordance with ISO 2439 B, of between 75 and 250 N, by reacting at least one polyisocyanate having at least two isocyanate groups with one or more liquid compounds which have at least two isocyanate reactive groups and at least one of which contain one or more solid polymers stably dispersed therein in an amount of 2.5 to 35 parts per 100 parts of said liquid isocyanate reactive groups containing compounds, wherein the wet compression set of the flexible polyurethane foam, measured in accordance with Renault 1637, is reduced to a value of less than 5% by including in said liquid isocyanate reactive groups containing compounds, per 100 parts thereof:
a) 50 to 80 parts of one or more polyoxyalkylene polyols having an oxyethylene unit content of at least 60 wt. % of the oxyalkylene units of the polyoxyalkylene polyol, a hydroxyl number of between 20 and 100, and a nominal functionality of 2 to 4;
b) 20 to 50 parts of one or more further polyoxyalkylene polyols containing no oxyethylene units or having an oxyethylene unit content lower than 40 wt. % of the oxyalkylene units of the further polyoxyalkylene polyol, and having a hydroxyl number of between 20 and 100, and a nominal functionality of 2 to 4.

2. A process as claimed in claim 1, wherein the amount of said solid polymer is selected in such a manner that the ILD 40% hardness of the foam is between 90 and 200N.

3. A process as claimed in claim 1, wherein said liquid isocyanate reactive groups containing compounds contain, per 100 parts thereof, at least 5 parts, of said one or more solid polymers.

4. A process as claimed in claim 1, wherein said liquid isocyanate reactive groups containing compounds comprise no crosslinkers/extenders having a hydroxyl number greater than 100 or, per 100 parts of said liquid isocyanate reactive groups containing compounds, less than 5 parts, of such crosslinkers/extenders.

5. The process according to claim 1, wherein said liquid isocyanate reactive groups containing compounds comprise no alkanolamine crosslinkers/extenders having a hydroxyl number greater than 100 or, per 100 parts of said liquid isocyanate reactive groups containing compounds, less than 1 part, of such alkanolamine crosslinkers/extenders.

6. The process according to claim 1, wherein the liquid isocyanate reactive groups containing compounds comprise, per 100 parts of said liquid isocyanate reactive groups containing compounds, at least 55 parts of said one or more polyoxyalkylene polyols.

7. The process according to claim 1, wherein the liquid isocyanate reactive groups containing compounds comprise, per 100 parts of said liquid isocyanate reactive groups containing compounds, less than 75 parts of said one or more polyoxyalkylene polyols.

8. The process as according to claim 1, wherein the liquid isocyanate reactive groups containing compounds comprise, per 100 parts of said liquid isocyanate reactive groups containing compounds, at least 85 parts of said one or more polyoxyalkylene polyols and said one or more further polyoxyalkylene polyols.

9. The process according to claim 1, wherein said one or more polyoxyalkylene polyols have an oxyethylene unit content of less than 90 wt. %, of the oxyalkylene units of the polyoxyalkylene polyol.

10. The process according to claim 1, wherein said polyisocyanate and said isocyanate reactive groups containing compounds are reacted in accordance with an isocyanate index of between 80 and 120.

11. The process according to claim 1, wherein said flexible polyurethane foam is made by a one-shot process.

12. The flexible foam obtained by a process according to claim 1, which foam has a density of between 30 and 70 kg/m$^3$, a resilience, measured in accordance with ASTM D 3574 H, higher than 40%, an ILD 40% hardness, measured in accordance with ISO 2439 B, of between 75 and 250 N and a wet compression set, measured in accordance with Renault 1637, of less than 5%.

13. A flexible foam according to claim 12, which foam has a tear resistance, measured in accordance with ASTM D3574 F, higher than 1 N/cm and a tensile strength, measured in accordance with EN ISO 1798, higher than 50 kPa.

14. A flexible foam as claimed in claim 12, which foam has a resilience, measured at 20° C. in accordance with ASTM D 3574 H, higher than 50%, and a wet compression set, measured in accordance with Renault 1637, of less than 5%.

15. The process according to claim 1, wherein the wet compression set of the flexible polyurethane foam, measured in accordance with Renault 1637 is less than 2.5%.

16. The process according to claim 1, wherein the polyoxyalkylene polyols having an oxyethylene unit content of at least 60 wt. % of the oxyalkylene units of the polyoxyalkylene polyol have a hydroxyl number of between 20 and 60, and the polyoxyalkylene polyols containing no oxyethylene units or having an oxyethylene unit content lower than 40 wt. % of the oxyalkylene units of the further polyoxyalkylene polyol have a hydroxyl number of between 20 and 60.

17. The process according to claim 5, wherein said liquid isocyanate reactive groups containing compounds comprise per 100 parts of said liquid isocyanate reactive groups containing compounds, less than 0.5 parts of such alkanolamine crosslinkers/extenders.

18. The process according to claim 1, wherein said one or more polyoxyalkylene polyols have an oxyethylene unit content of at least 70 wt. % of the oxyalkylene units of the polyoxyalkylene polyol.

19. The process according to claim 1, wherein said polyisocyanate and said isocyanate reactive groups containing compounds are reacted in accordance with an isocyanate index greater than 100.

* * * * *